United States Patent [19]

Reichenbacher et al.

[11] 3,777,599
[45] Dec. 11, 1973

[54] PROCESS FOR PRODUCING SPLIT-THICKNESS ANIMAL SKIN FOR PROTECTING FLAYED HUMAN TISSUE

[75] Inventors: Frank W. Reichenbacher, Scottsdale; Theodore C. Kraver; Edward F. Hope, both of Phoenix, Ariz.

[73] Assignee: Burn Treatment Skin Bank, Inc., Phoenix, Ariz.

[22] Filed: Aug. 23, 1971

[21] Appl. No.: 173,805

[52] U.S. Cl. .................................. 83/39, 69/21
[51] Int. Cl. ................................. C14b 1/14
[58] Field of Search .................... 83/13, 20, 23, 39; 69/21, 21.5

[56] References Cited
UNITED STATES PATENTS
1,284,013  11/1918  Winkley .............................. 69/21.5
2,374,836  5/1945  Ruedebush .......................... 69/21
3,710,662  1/1973  Olday .................................. 83/20

Primary Examiner—Donald R. Schran
Attorney—Charles E. Cates

[57] ABSTRACT

A process for making full thickness hides of freshly slaughtered animals into split-thickness skin coverings for use in covering flayed sites of the human body where full thicknesses or partial thicknesses of portions of the skin have been destroyed by burns, trauma or ulcerative conditions. A full thickness animal hide is cut into convenient strips, the hair and excess fat are removed from the strips to provide smoother, more regular surfaces thereon to facilitate the removal of a uniform dimension split-thickness external portion of the strip of animal skin. The exfoliation step is performed while supporting the inner side of the strip of animal skin against a block of resilient material, the surface of which deforms to adjust itself to the somewhat irregular inner surface of the animal skin so as to exert substantially even pressures on the inner surface, thus presenting a functionally level outer surface of animal skin to the cutting tool used to exfoliate a thin uniform-thickness strip of outer skin. This process avoids making large unnatural holes which would lessen the effectiveness of the finished product and is more efficient and more reliable than prior art methods.

4 Claims, 7 Drawing Figures

PATENTED DEC 11 1973 3,777,599

INVENTORS
FRANK W. REICHENBACHER
BY THEODORE C. KRAVER
EDWARD F. HOPE

Charles E. Cates
ATTORNEY

PROCESS FOR PRODUCING SPLIT-THICKNESS ANIMAL SKIN FOR PROTECTING FLAYED HUMAN TISSUE

BACKGROUND OF THE INVENTION

For many years it has been recognized that the use of homograft skin on human burn wounds is effective in restoring the water vapor barrier, decreasing protein losses in wound exudate, protecting the wound from sepsis, relieving the pain of the open wound thus promoting therapeutic mobility, increasing the epithelialization rate in second degree burns, and for use after eschar separation to produce healthy, clean, evenly granulated tissue for autografting in third degree burns. But the limited availability of homograft skin prompted the initial users to leave the skin in place until rejection. Consequently, the beneficial initial results were negated by the rejection mechanism itself which usually produced an unhealthy granulated tissue highly susceptible to infection. Further clinical investigation led to the use of skin as a temporary biologic dressing, which was changed in time intervals of from 1 to 5 days. This technique avoided the rejection process but still produced the beneficial results. The availability of homograft skin thus became even more critical because of the larger quantities used for temporary dressings. Since rejection was no longer a factor, investigations were directed to the use of animal skins available in commercial quantities. Porcine skin heterograft proved to be the best substitute for the homograft skin. Burn centers began acquiring and using porcine skin in their burn services during the 1960's. It is a conservative estimate that over 3,000 burn victims were treated in that decade by the use of porcine skin heterografts. But with over 60,000 major burns a year to be treated in the United States, this source of skin was still not being utilized by a significant number of burn centers.

The potentially unlimited supply of porcine skin was not being used to full advantage because of the slow, inefficient and generally unreliable methods available to hospital personnel for harvesting the skin from live pigs or from hides obtained from local slaughter houses. There were two general methods of taking split-thickness portions of the skin of pigs and other animals. One method was to anaesthetize a live animal, shave it and exfoliate an outer layer of skin for use as a surgical dressing. Another method was to shave the hair from the hides of slaughtered animals and exfoliate strips of outer skin from the hides. Another disadvantage of these prior art methods was that dressing skins made by them were of poor quality because of the presence of thick and thin spots and large unnatural holes.

The importance of uniform thicknesses of dressing skins free from unnatural holes needs emphasis. All skins have natural submicroscopic openings which allow the skin to breathe. These natural openings are a very useful property of skin and account for the principal advantage of natural skin over artificial coverings. However, the presence of unnatural holes of larger than normal size is undesirable because they permit the escape of body fluids and permit the entry of infectious organisms. A skin having an uneven inner surface is difficult and practically impossible to process by prior art methods without making unnatural holes because the surface presented to the cutting tool undulates as the cutting tool moves past the irregularities of the inner surface. During exfoliation sufficient support must be given to at least that part of the skin which is in the vicinity of the edge of the cutting tool to enable the tool to operate properly in cutting the outer surface. When the support of the skin is too hard and unyielding the inner surface tends to flatten and its irregularities are assumed by the outer surface. This presents a functionally uneven or non-level outer surface to the cutting tool. Because of the thinness of the outer surface skin which is taken, the prior art methods make it inevitable that the cutting tool leave holes where it skips the depressions in the outer surface of the skin.

OBJECTS OF THE INVENTION

It is, therefore, a broad object of this invention to provide a more efficient and reliable process for preparing split-thickness animal skin for ultimate use as a dressing skin.

It is a more specific object of this invention to provide a process for preparing dressing skins of uniform dimensions (i.e., length, width, and thickness), free of large unnatural holes, hair and foreign particles.

DEFINITIONS

As used in this disclosure:

Dressing skin means a split-thickness of animal skin, taken from the outer portion of the skin and suitable for surgical use as a temporary dressing for wounds involving loss of human skin. This term, depending upon the context, may designate either the fully prepared product, ready for application, or the intermediate product as it exists before treatment for the destruction of infectious organisms and final packaging.

Skin refers to the animal skin generally in its various stages of preparation including the natural state.

Defatted skin means a skin from which excess undesired fat has been removed.

Exfoliation means the removal of a split-thickness of an animal skin.

SUMMARY OF THE INVENTION

Briefly, there has been provided a process for preparing dressing skins from full thickness animal hides for use as a temporary covering for the exposed wounds of humans who have suffered loss of skin through burns, abrasions, ulcers and the like. The method comprises the steps of cutting raw full thickness hides into elongate strips for ease in handling, removing excess fat from the inside surfaces of said strips of hide to provide a smoother surface for subsequent processing, shaving said strips of skin to remove external hair, cleansing the skin strips of loose matter and cutting a thin layer of substantially uniform thickness skin from the outer surfaces of each of said strips of skin, using a deformable material as support for the inner surface of the skin so as to present a functionally level outer surface to the edge of the cutting tool employed. The steps of removing excess fat and shaving the strips may be reversed. To the process briefly described above should be added the additional step of treating the thin layers of strips of skin with antibiotics to destroy infectious organisms. Betadine (povidone iodine) and neomycin sulphate solutions have been found highly satisfactory for the purpose.

The animal hides which are the subject of the foregoing processes may be taken from any common domestic animal such as dogs, cows and pigs, but porcine skin has proved to be best suited for use in the processes disclosed herein.

DRAWINGS

The subject matter of the invention is particularly pointed out and distinctly claimed in the concluding portion of the specification. The invention, however, both as to organization and method of operation, may be understood better by reference to the following description taken in connection with the accompanying drawing in which:

DETAILED DESCRIPTION OF THE INVENTION

Turning now to the drawings, which in conjunction with the detailed description of the presently preferred practice of this invention will give those skilled in the art a fuller understanding of the invention herein, the starting material for the process is the skin 1 of a freshly slaughtered pig. Uniform strips 3 are cut from the pig skin 1. The preferred dimensions are 3 inches wide by 4 feet long, and (at this point of the process) the full thickness of the hide of the skin 1.

Any convenient means of cutting the strips into uniform sizes may be used. A preferred means is to spread the hide and secure it in place in spatial relationship to a guide. By making knife cuts along the outlines of the guide, the hide can be cut into strips of the desired dimensions. For ease of handling in further processing, packaging and use, 3 inch by 4 foot dimensions are preferred.

Figure 3:
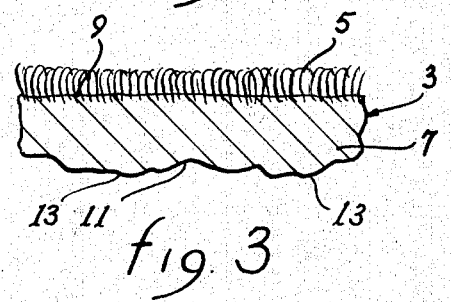
FIG. 3 is a cross-section of a typical strip taken from the skin shown in FIG. 2
Figure 4:
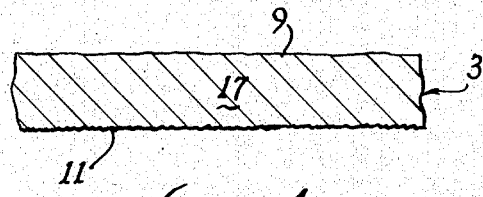
FIG. 4 is an end view of a typical strip of pig skin after the hair and the excess fat have been removed therefrom
Figure 5:
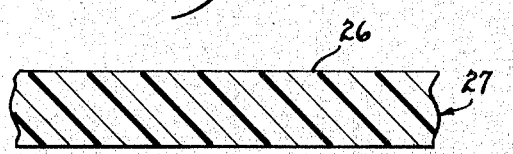
FIG. 5 is a cross section of a block of resiliently deformable material for use in this process.

In FIG. 3, which is an end view of the strips 3, the hair 5 and excess fat 7 are shown. The hair 5 generally has an uneven distribution on the outer surface 9, appearing in swirls which make a matted, lumped and uneven surface. Whereas the hair is on the outer surface 9, the fat appears on the inner surface 11 and has fatty prominences 13. Both the external hair 5 and the fatty prominences 13 of the fat layer 7 should be removed by shaving and surgical trimming respectively. It will be seen that the inner surface 11 still presents a somewhat irregular surface, although the grosser prominences 13 have been removed and the resulting inner surface 11 is relatively smooth. The prepared strips, after depilation and defatting appear in FIG. 4 which is an end view of the strip 3.

The defatted and shaved skin strips 3 should then be washed gently to remove any remaining hair, loose particles of skin, and any foreign objects on the skin strips 3.

Figure 1:
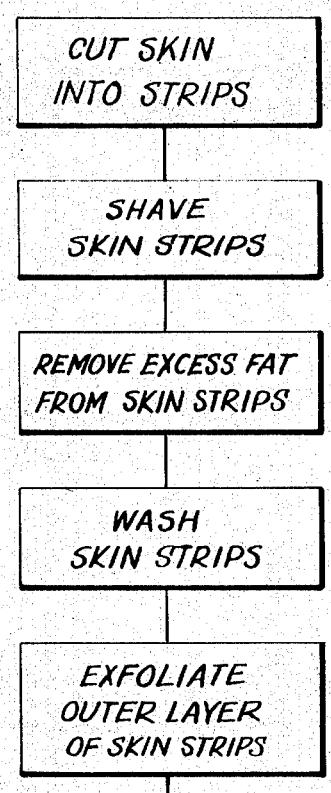
FIG. 1 is a flow chart of the principal steps in the process for preparing the skin.
Figure 7:
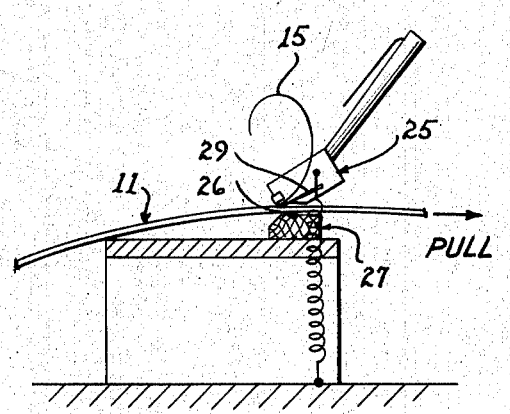
FIG. 7 is a schematic representation of a dermatome in functional relationship to the block of resiliently deformable support material and a skin strip being exfoliated
Figure 2:
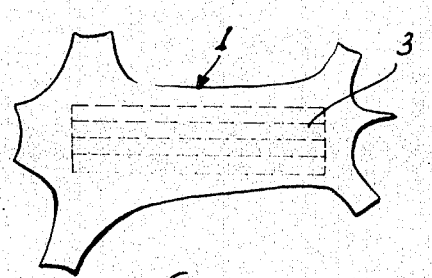
FIG. 2 is an illustration of a typical pig skin with standard strips to cut therefrom indicated in phantom outline
Figure 6:
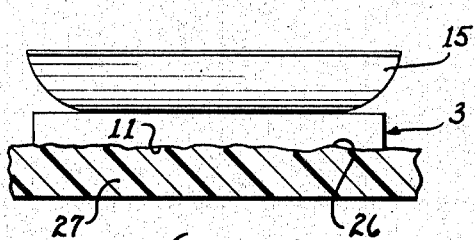
FIG. 6 shows the deformable material in functional relationship to the skin of FIG. 4 in the exfoliation step

A desired substantially uniform thickness 15 is next cut from the outer surface 9 of the skin strip 3. The preferred thickenss is 0.015 inch. This important step can be accomplished in several ways. The presently preferred method is to use a resiliently deformable cushion 27 of expanded polyethyene in spaced substantially parallel relationship to the cutting edge 29 of a pneumatic dermatome 25. The resilient displacement of the cushion 27 is illustrated in FIG. 6 and the operation of the dermatome is illustrated schematically in FIG. 7. As the prepared skin strip 3 is drawn through the space between the cutting edge 29 of the dermatome 25 and the surface 26 of the resilient cushion 27 the latter is deformed at its surface 26 by the skin's inner surface 11. The cushion assumes the shape of, and exerts substantially uniform pressure on, the inner surface 11 of the skin strip 3, presenting a smooth outer surface to the dermatome and thus permitting the cutting edge 29 to take a uniform thickness from the outer surface 9 of the skin 3. As the cutting edge 29 progresses along the length of the skin strip 3 the substratum 17 of the skin strip 3 in the proximity of the area being cut must rest with its inner surface 11 contacting the resilient surface 26 of cushion 27. Cushion 27 should be deformable enough to permit the prominent portions of the inner surface 11 of the substratum 17 to displace the surface 26 of the cushion 27 so that a substantially even pressure is exerted against the irregular inner surface 11; otherwise, thin spots and unnatural holes will result.

The compression strength of the resiliently deformable means for supporting the inner side of the skin strip must be selected with care.

"Ethofoam" brand of expanded polystyrene made by Dow Chemical Co. is the most satisfactory substance now known. It is two pound density material having an observed density range of about 2.0 to 2.6 pounds per cubic foot and a compression strength of about 7 p.s.i. Workers ordinarily skilled in the art will have no difficulty in selecting other materials which will perform comparably and the specification here of a particular material is not meant to be in any way a limitation of the generality of the invention.

The process of this invention is faster, more efficient, more reliable and more economical than the prior art processes. The foregoing description thereof will suggest other advantages to those skilled in the art, as well as various changes, substitutions and other departures from the disclosure within the spirit and scope of the appended claims.

What is claimed is:

1. A process using cutting tools for preparing dressing skins from full thickness animal hides for use as a temporary covering for the exposed wounds of humans who have suffered loss of skin through injury and disease which comprises:
    a. cutting raw, full thickness animal hides into elongate strips for ease of handling;
    b. cutting excess fat from said strips of skin to provide smoother strips for subsequent processing;
    c. shaving said defatted strips of skin to remove external hair;
    d. exfoliating a substantially uniform thickness from each of said strips of skin by supporting the inner surface thereof, at least opposite the point of cutting contact, with a resiliently deformable substance capable of assuming the configuration of said inner surface as it comes in supporting contact therewith, whereby said skin strip presents a firm and substantially smooth outer surface to the cutting tool.

2. A process using cutting tools for preparing dressing skins from full thickness animal hides for use as a covering for the exposed wounds of humans who have suffered loss of skin through injury and disease which comprises:
   a. cutting raw, full thickness hides into elongate strips for ease of handling;
   b. shaving said strips of hide to remove external hair;
   c. cutting excess fat from said strips of skin to provide a smoother substrate for subsequent processing.
   d. exfoliating a substantially uniform thickness from each of said strips of skin by supporting the inner surface thereof, at least opposite the point of cutting contact, with a resiliently deformable substance capable of assuming the configuration of said inner surface as it comes in supporting contact therewith, whereby said skin strip presents a firm and substantially smooth outer surface to the cutting tool.

3. The process of claim One wherein said animal skin is porcine.

4. The process of claim Two wherein said animal skin is porcine.

* * * * *